(12) United States Patent
Fan et al.

(10) Patent No.: US 11,914,764 B2
(45) Date of Patent: Feb. 27, 2024

(54) HEAD MOUNTED DISPLAY DEVICE

(71) Applicant: HTC Corporation, Taoyuan (TW)

(72) Inventors: Fu-Cheng Fan, Taoyuan (TW); Siye Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 86 days.

(21) Appl. No.: 17/512,677

(22) Filed: Oct. 28, 2021

(65) Prior Publication Data

US 2022/0308662 A1    Sep. 29, 2022

Related U.S. Application Data

(60) Provisional application No. 63/166,243, filed on Mar. 26, 2021.

(51) Int. Cl.
*G06F 3/01* (2006.01)
*H04N 13/239* (2018.01)
*G02B 27/01* (2006.01)

(52) U.S. Cl.
CPC ......... *G06F 3/013* (2013.01); *G02B 27/0172* (2013.01); *H04N 13/239* (2018.05); *G02B 2027/0138* (2013.01)

(58) Field of Classification Search
CPC ............... G06F 3/013; G02B 27/0172; G02B 2027/0138; G02B 27/0093; G02B 27/0179; G02B 2027/0187; H04N 13/239; G06V 40/1318; G06V 10/143; G06V 10/147
See application file for complete search history.

(56) References Cited

U.S. PATENT DOCUMENTS

| | | | | |
|---|---|---|---|---|
| 4,852,988 A * | 8/1989 | Velez | ..................... | A61B 3/113 351/158 |
| 8,885,882 B1 * | 11/2014 | Yin | ........................ | G06V 40/19 382/103 |
| 9,274,599 B1 * | 3/2016 | D'Amico | ................. | G06F 3/013 |
| 2017/0285735 A1 * | 10/2017 | Young | ..................... | G06F 3/013 |
| 2017/0285736 A1 * | 10/2017 | Young | ..................... | G06F 3/147 |
| 2018/0032133 A1 * | 2/2018 | Cho | ......................... | G06F 3/013 |
| 2018/0149874 A1 * | 5/2018 | Aleem | ............... | G02B 27/0093 |
| 2019/0018485 A1 * | 1/2019 | Aleem | .................... | G06F 3/147 |
| 2019/0049722 A1 * | 2/2019 | Deng | .................... | G02B 27/017 |
| 2020/0183152 A1 * | 6/2020 | Pennell | ................ | G02B 27/141 |
| 2020/0183174 A1 * | 6/2020 | Noui | .................. | G02B 27/0172 |

(Continued)

FOREIGN PATENT DOCUMENTS

CN    111665622    9/2020

OTHER PUBLICATIONS

"Office Action of Taiwan Counterpart Application", dated Dec. 6, 2022, p. 1-p. 4.

*Primary Examiner* — Dmitriy Bolotin
(74) *Attorney, Agent, or Firm* — JCIPRNET (57) ABSTRACT

A head mounted display device, including a frame, a mask, at least one infrared (IR) transmitter, and at least one image capture device, is provided. The mask has a first light reflection layer on a first side. The IR transmitter is disposed in the frame and is used to emit an emitting light beam toward the first light reflection layer. The first light reflection layer reflects the emitting light beam to send a reflective light beam toward a target area. The image capture device is disposed in the frame and is used to capture a target area reflective image of the target area.

19 Claims, 8 Drawing Sheets

(56) References Cited

U.S. PATENT DOCUMENTS

| | | | | |
|---|---|---|---|---|
| 2020/0285058 A1* | 9/2020 | Sangu | .................. | G02B 26/125 |
| 2021/0099632 A1* | 4/2021 | Molholm | ............. | H04N 23/611 |
| 2021/0349532 A1* | 11/2021 | Kim | .................. | G02B 27/0172 |
| 2021/0397253 A1* | 12/2021 | Kocdemir | ............... | G06F 3/013 |
| 2022/0108458 A1* | 4/2022 | Vostrikov | ............. | G06V 40/193 |
| 2022/0229298 A1* | 7/2022 | Song | .................. | G02B 27/0172 |
| 2022/0276704 A1* | 9/2022 | Border | .................. | G06V 20/20 |

\* cited by examiner

HEAD MOUNTED DISPLAY DEVICE

CROSS-REFERENCE TO RELATED APPLICATION

This application claims the priority benefit of U.S. Provisional Application No. 63/166,243, filed on Mar. 26, 2021. The entirety of the above-mentioned patent application is hereby incorporated by reference herein and made a part of this specification.

BACKGROUND

Technical Field

The disclosure relates to a head mounted display device, and more particularly relates to a head mounted display device that captures an eyeball image through the mechanism of light reflection.

Description of Related Art

Among head mounted display products for providing virtual reality and augmented reality that are currently on the market, cameras for executing eyeball tracking actions generally adopt an exposed design. In other words, the cameras for executing eyeball tracking actions are all disposed around the display. As a result, when the camera needs to capture an image of the eyeballs of the user, there is often a considerable angle difference between the lens of the camera and the eyeballs of the user, which affects the performance of the head mounted display device.

SUMMARY

The disclosure provides a head mounted display device that captures an eyeball image through the mechanism of light reflection.

The head mounted display device of the disclosure includes a frame, a mask, at least one infrared transmitter, and at least one image capture device. The mask has a first light reflection layer on a first side. The infrared transmitter is disposed in the frame and is used to emit an emitting light beam toward the first light reflection layer. The first light reflection layer reflects the emitting light beam to send a reflective light beam toward a target area. The image capture device is disposed in the frame and is used to capture a target area reflective image of the target area.

Based on the above, the disclosure reflects the emitting light beam generated by the infrared transmitter to the target area through the light reflection layer on the mask. The image capture device of the disclosure is used to capture the target area reflective image of the target area. In this way, the infrared emitting light beam may be projected to the target area frontally, and the image capture device may capture a frontal eyeball image of the user, which can improve the accuracy of an eyeball tracking action.

DETAILED DESCRIPTION OF DISCLOSED EMBODIMENTS

Figure 1:
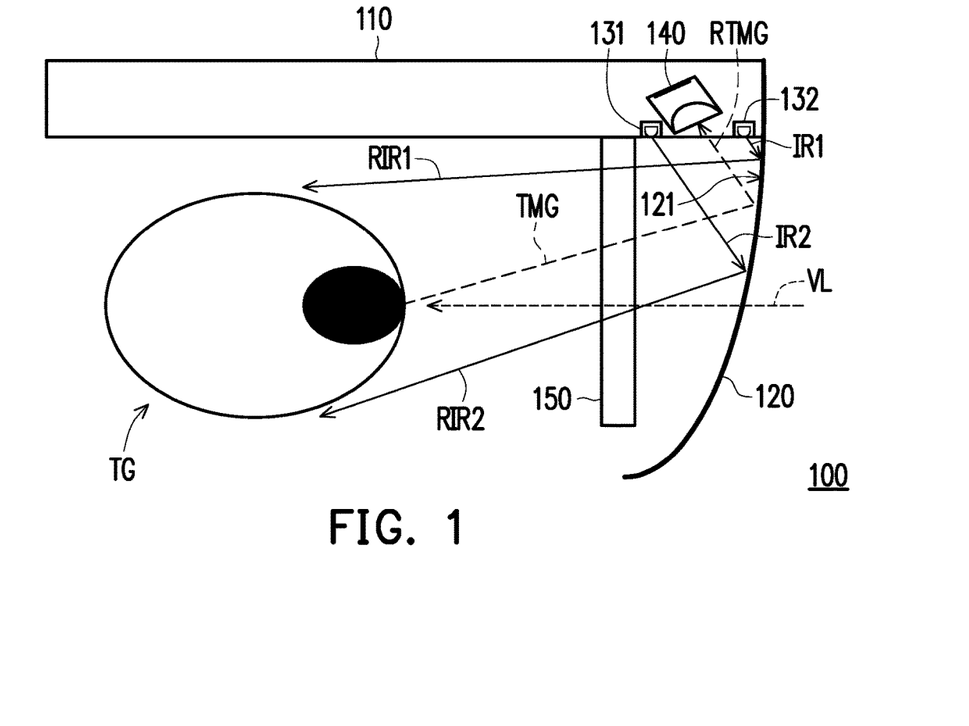
FIG. 1 is a schematic view of a head mounted display device according to an embodiment of the disclosure.

Please refer to FIG. 1. FIG. 1 is a schematic view of a head mounted display device according to an embodiment of the disclosure. A head mounted display device 100 includes a frame 110, a mask 120, infrared transmitters 131 and 132, an image capture device 140, and a display 150. The frame 110 is combined with the mask 120. The mask 120 is disposed in front of a target area TG. The target area TG corresponds to positions of the eyeballs of the user of the head mounted display device 100.

The mask 120 has a light reflection layer 121 on a first side thereof. In the embodiment, the first side of the mask 120 is the side facing the target area TG. In addition, the infrared transmitters 131 and 132 are disposed in the frame 110, and the infrared transmitters 131 and 132 are used to respectively emit emitting light beams IR1 and IR2 toward the light reflection layer 121. The light reflection layer 121 also reflects the emitting light beams IR1 and IR2 to respectively send reflective light beams RIR1 and RIR2 toward the target area TG. The number of the infrared transmitters 131 and 132 in the embodiment is two, which is only an example for illustration. In other embodiments of the disclosure, the number of infrared transmitters may be one or more, which is not particularly limited.

In addition, the image capture device 140 is disposed in the frame 110. The image capture device 140 is used to capture a target area reflective image RTMG of the target area TG. In the embodiment, a target area image TMG of the target area TG may be transmitted to the light reflection layer 121. The light reflection layer 121 is used to reflect the target area image TMG to generate the target area reflective image RTMG, and the target area reflective image RTMG is projected into the image capture device 140. It is worth noting that in the embodiment, when the reflective light beams RIR1 and RIR2 are projected to the target area TG, in the target area reflective image RTMG captured by the image capture device 140, there may be light spots generated by the reflective light beams RIR1 and RIR2.

From the above description, it can be known that the head mounted display device 100 of the disclosure may analyze the light spots generated on the eyeballs of the user through the target area reflective image RTMG obtained by the image capture device 140, so as to execute an eyeball tracking action. In the embodiment, through the mechanism of light reflection, incidence angles of the reflective light beams RIR1 and RIR2 projected to the target area TG may be effectively reduced, and an included angle between an image capture direction of the image capture device 140 and a normal vector of the eyeballs may also be effectively reduced. In other words, the image capture device 140 may capture a frontal eyeball image of the user, which can effectively improve the accuracy of eyeball tracking.

Furthermore, the display 150 in the embodiment is disposed between the target area TG and the mask 120, and is combined with the frame 110. The display 150 may be a transmissive display, the mask 120 may be a transparent mask, and a visible light VL may be transmitted to the target area TG through the mask 120 and the display 150. The display 150 may be used to provide virtual reality or augmented reality display images.

Figure 2A:
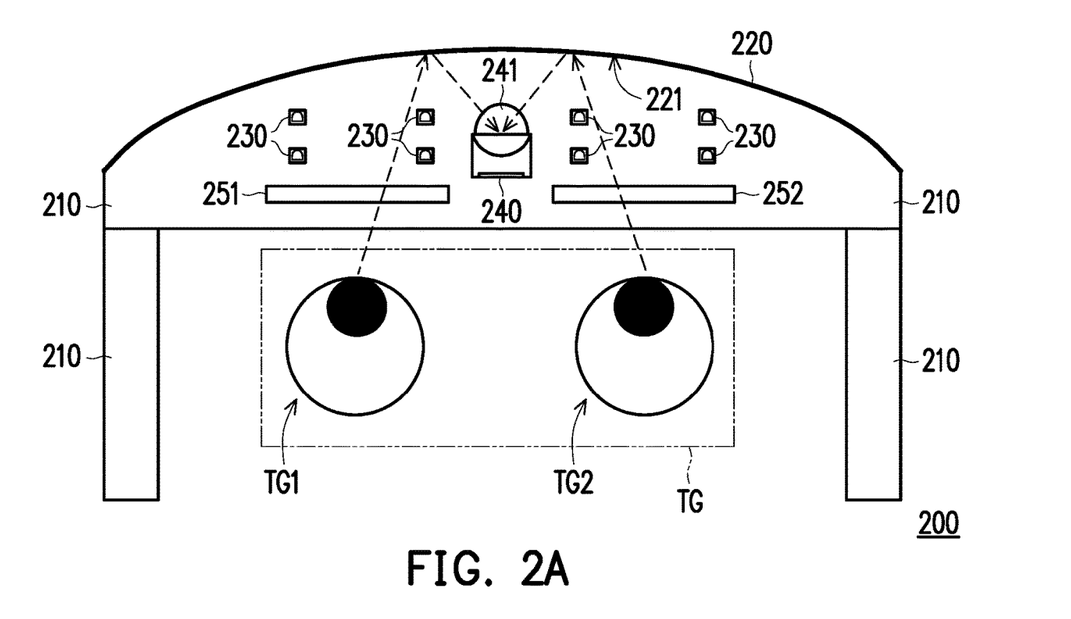
FIG. 2A is a top view of a head mounted display device according to another embodiment of the disclosure.

Please refer to FIG. 2A. FIG. 2A is a top view of a head mounted display device according to another embodiment of the disclosure. A head mounted display device 200 includes a frame 210, a mask 220, an infrared transmitter 230, an image capture device 240, and displays 251 and 252. In the embodiment, a target area TG may be divided into a first region TG1 corresponding to a first eye of the user and a second region TG2 corresponding to a second eye of the user. The displays 251 and 252 are located between the first region TG1 and the second region TG2 and the mask 220. The image capture device 240 may be disposed in the frame 210 and located between the displays 251 and 252.

In the embodiment, the mask 220 has a light reflection layer 221 on the side facing the target area TG. The light reflection layer 221 may be a light reflection coating or composed of a light reflection material coated on the mask 220. There may be a fisheye lens 141 on the lens of the image capture device 240. The fisheye lens 241 enables the image capture device 240 to simultaneously capture a first target area reflective image corresponding to the first eye of the user and a second target area reflective image corresponding to the second eye of the user. In the embodiment, the head mounted display device 200 may obtain the images of both eyes of the user in the target area TG through disposing the single image capture device 240.

Furthermore, in the embodiment, the number of the infrared transmitter 230 is multiple, and the infrared transmitters 230 may be evenly distributed in the frame 210. Part of the infrared transmitters 230 are used to project emitting light beams to the light reflection layer 221, and generate and transmit reflective light beams to the first eye of the user through the light reflection layer 221. The other part of the infrared transmitters 230 are used to project emitting light beams to the light reflection layer 221, and generate and transmit reflective light beams to the second eye of the user through the light reflection layer 221.

Figure 2B:
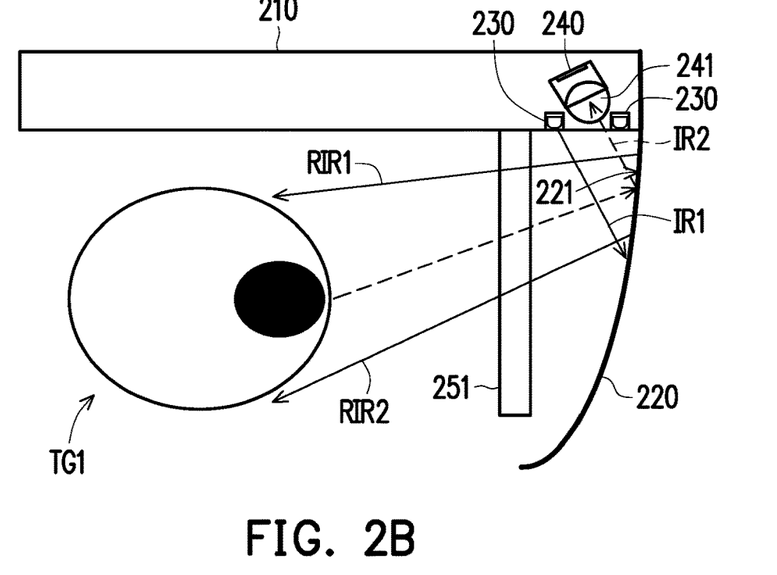
FIG. 2B is a side view of a head mounted display device 200 according to the embodiment in FIG. 2A of the disclosure.

Please refer to FIG. 2B below. FIG. 2B is a side view of the head mounted display device 200 of the embodiment in FIG. 2A of the disclosure. The infrared transmitter 230 is used to generate the emitting light beams IR1 and IR2. The light reflection layer 221 on the mask 220 reflects the emitting light beams IR1 and IR2 to generate the reflective light beams RIR1 and RIR2, and transmits the reflective light beams RIR1 and RIR2 to the first region TG1. The image capture device 240 captures the target area reflective image of the eyeballs of the user in the first region TG1 through the fisheye lens 241 and the light reflection layer 221 on the mask 220.

Figure 3:
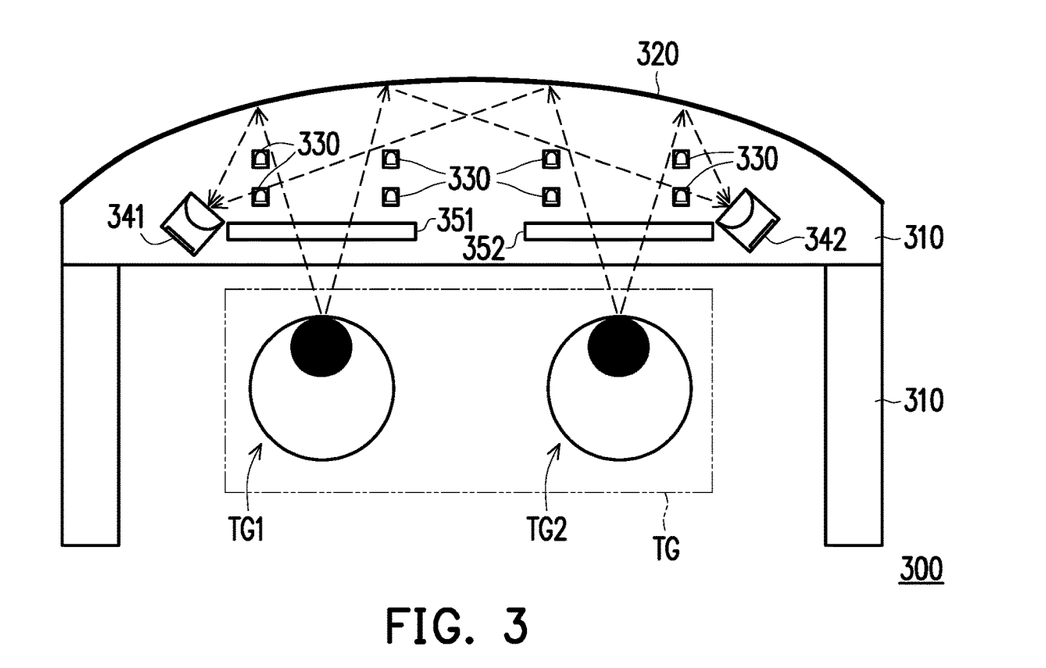
FIG. 3 is a schematic view of a head mounted display device according to another embodiment of the disclosure.

Please refer to FIG. 3 below. FIG. 3 is a schematic view of a head mounted display device according to another embodiment of the disclosure. A head mounted display device 300 includes a frame 310, a mask 320, an infrared transmitter 330, image capture devices 341 and 342, and displays 351 and 352. Different from the embodiment in FIG. 2A, the head mounted display device 300 of the embodiment has two image capture devices 341 and 342. The image capture devices 341 and 342 are disposed on two opposite sides of the frame 310. The image capture device 341 is used to simultaneously capture a first target area reflective image corresponding to a first eye of the user in a first region TG1 and a second target area reflective image corresponding to a second eye of the user in a second region TG2, and the image capture device 342 is used to simultaneously capture a third target area reflective image corresponding to the first eye of the user in the first region TG1 and a fourth target area reflective image corresponding to the second eye of the user in the second region TG2. The first target area reflective image, the second target area reflective image, the third target area reflective image, and the fourth target area reflective image may be used as the basis for an eyeball tracking action.

Figure 4:
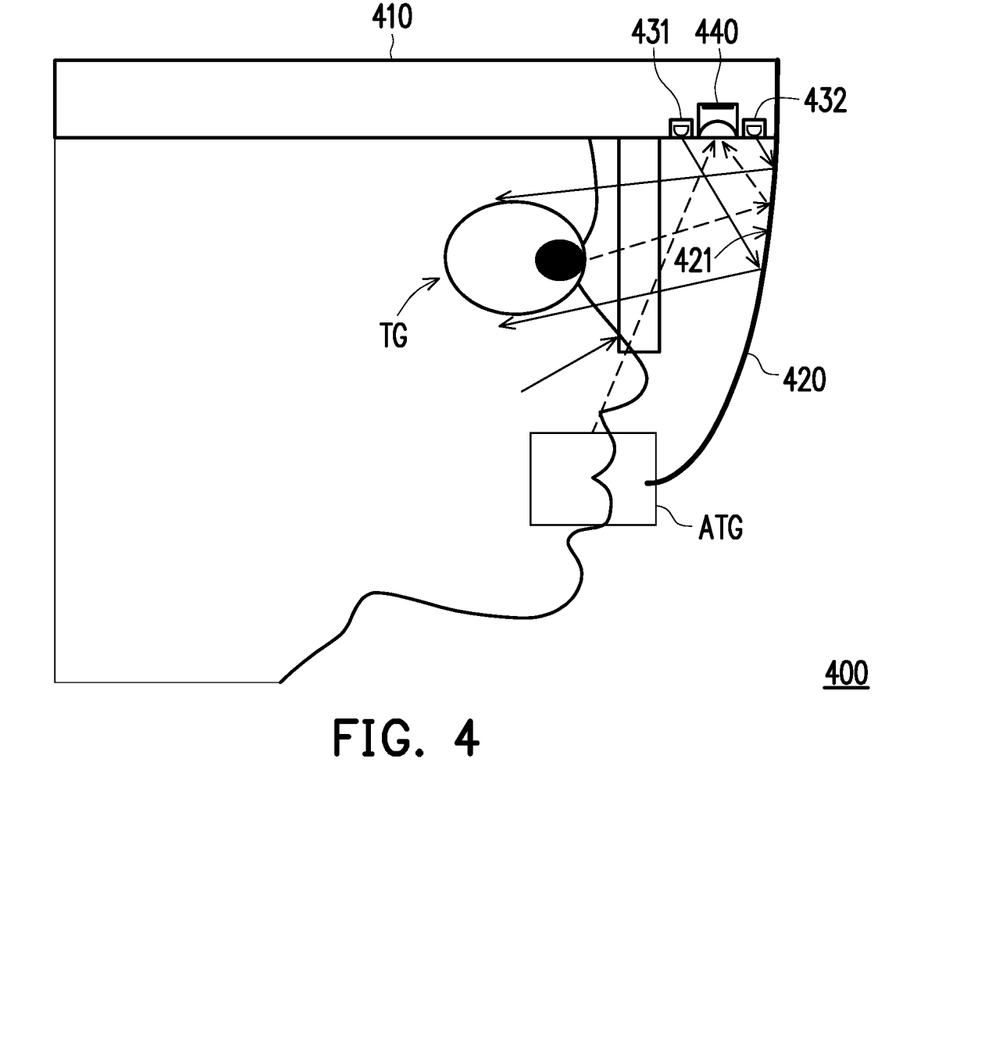
FIG. 4 is a schematic view of a head mounted display device according to another embodiment of the disclosure.

Please refer to FIG. 4. FIG. 4 is a schematic view of a head mounted display device according to another embodiment of the disclosure. A head mounted display device 400 includes a frame 410, a mask 420, infrared transmitters 431 and 432, an image capture device 440, and a display 450. In the embodiment, the frame 410 is combined with the mask 420. The mask 420 is disposed in front of a target area TG. The target area TG corresponds to positions of the eyeballs of the user of the head mounted display device 400. The mask 420 has a light reflection layer 421 on a first side thereof. In the embodiment, the first side of the mask 420 is the side facing the target area TG. In addition, the infrared transmitters 431 and 432 are disposed in the frame 410, and the infrared transmitters 431 and 432 are used to respectively emit emitting light beams toward the light reflection layer 421. The light reflection layer 421 reflects the emitting light beams toward the target area TG to respectively send corresponding reflective light beams. The image capture device 440 captures a target area reflective image corresponding to the target area through the light reflection layer 421.

In the embodiment, different from the foregoing embodiment, the image capture device 440 may be used to capture an auxiliary image on an auxiliary target area ATG. The auxiliary target area ATG may correspond to a lip part of the user, and the auxiliary image may be a lip image of the user. The lip image of the user is captured through the image capture device 440. The head mounted display device 400 may not only execute an eyeball tracking action, but also execute a lip tracking action of the user, which can effectively improve the performance of the head mounted display device 400.

It is worth mentioning that in the embodiment, the lens of the image capture device 440 may directly face the auxiliary target area ATG and directly capture the auxiliary image. The target area reflective image is an infrared light image, and the auxiliary image is a visible light image.

Figure 5:
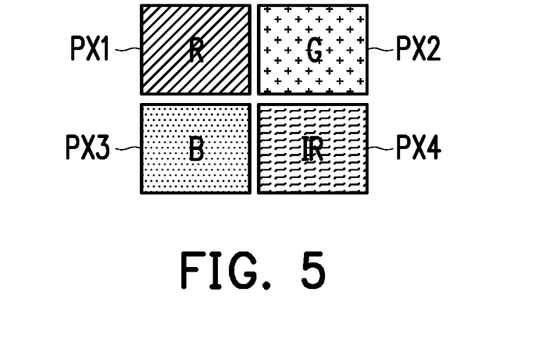
FIG. 5 is a schematic view of a structure of sensing pixels of an image capture device according to an embodiment of the disclosure.

In addition, please refer to FIG. 5. FIG. 5 is a schematic view of a structure of sensing pixels of an image capture device according to an embodiment of the disclosure. In order to simultaneously capture an infrared light image and a visible light image, the image capture device may have multiple visible light sensing pixels PX1 to PX3 and an infrared light sensing pixel PX4. The visible light sensing pixels PX1 to PX3 are respectively used to sense red (R), green (G), and blue (B) visible light images, and the infrared light sensing pixel PX4 is used to sense the infrared (IR) light images. The visible light sensing pixels PX1 to PX3 and the infrared light sensing pixel PX4 may be arranged in an array, but there is no specific arrangement sequence.

Figure 6A:
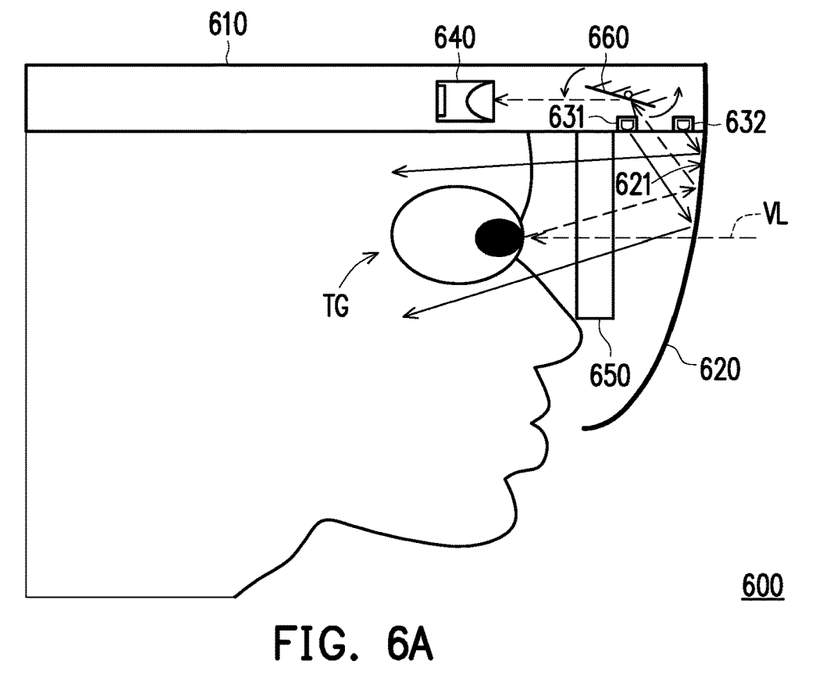
FIG. 6A and FIG. 6B are respectively schematic views of a head mounted display device according to different embodiments of the disclosure.
Figure 6B:
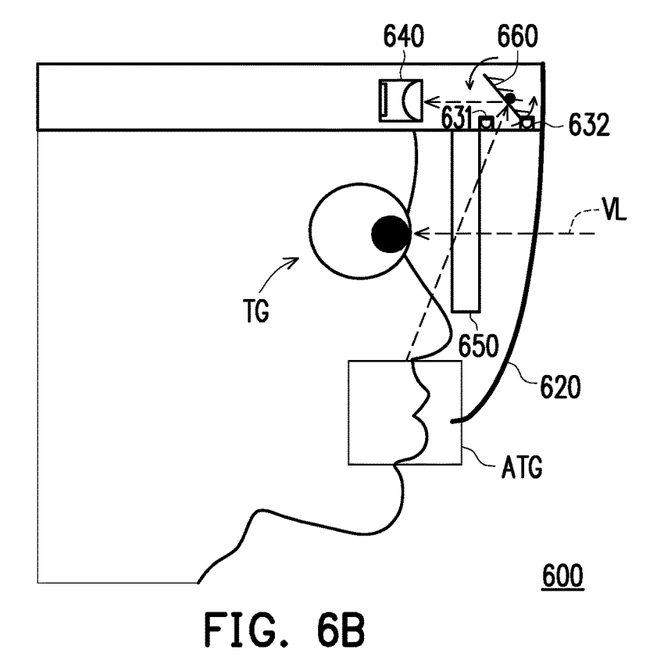

Please refer to FIG. 6A and FIG. 6B below. FIG. 6A and FIG. 6B are respectively schematic views of a head mounted display device according to different embodiments of the disclosure. In FIG. 6A, a head mounted display device 600 includes a frame 610, a mask 620, infrared transmitters 631 and 632, an image capture device 640, a display 650, and a light reflection element 660. The infrared transmitters 631 and 632, the image capture device 640, and the light reflection element 660 are all disposed in the frame 610. In the embodiment, the image capture device 640 may capture a target area reflective image on the light reflection layer 621 of the mask 620 through the light reflection element 660. Through the configuration of the light reflection element 660, the convenience of the image capture device 640 in terms of configuration can be improved, which facilitates the design of the head mounted display device 600 in terms of mechanical.

The image capture device 640 is a camera that can capture an infrared light image and a visible light image. The mask 620 may be a transparent mask, and the display 650 may be a transmissive display. A visible light VL may be transmitted to a target area TG through the mask 620 and the display 650.

It is worth mentioning that the light reflection surface of the light reflection element 660 may be adjusted. When the light reflection surface of the light reflection element 660 is at a first angle, the image capture device 640 may capture an image of the eyeballs of the user in the target area TG. In addition, when the light reflection surface of the light reflection element 660 rotates to a second angle, as shown in FIG. 6B, the image capture device 640 is used to capture a lip image of the user in an auxiliary target area ATG.

It can be seen from FIGS. 6A and 6B that through changing the light reflection surface of the light reflection element 660 between the first angle and the second angle, the head mounted display device 600 may respectively work in an eyeball tracking mode and a lip tracking mode, which effectively improves the performance of the head mounted display device 600.

Figure 7A:
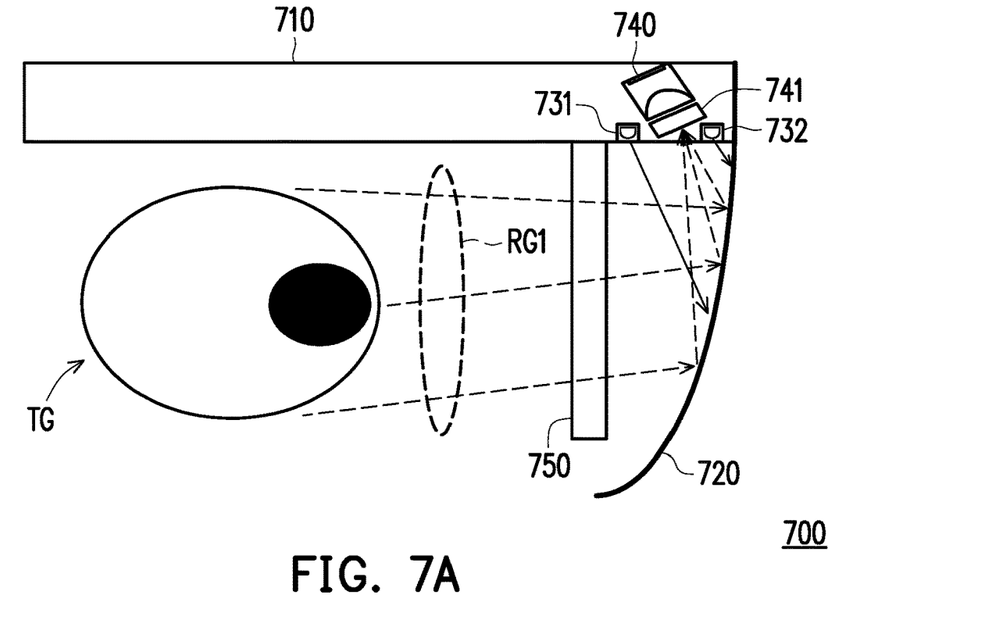
FIG. 7A and FIG. 7B are respectively schematic views of a head mounted display device according to different embodiments of the disclosure.
Figure 7B:
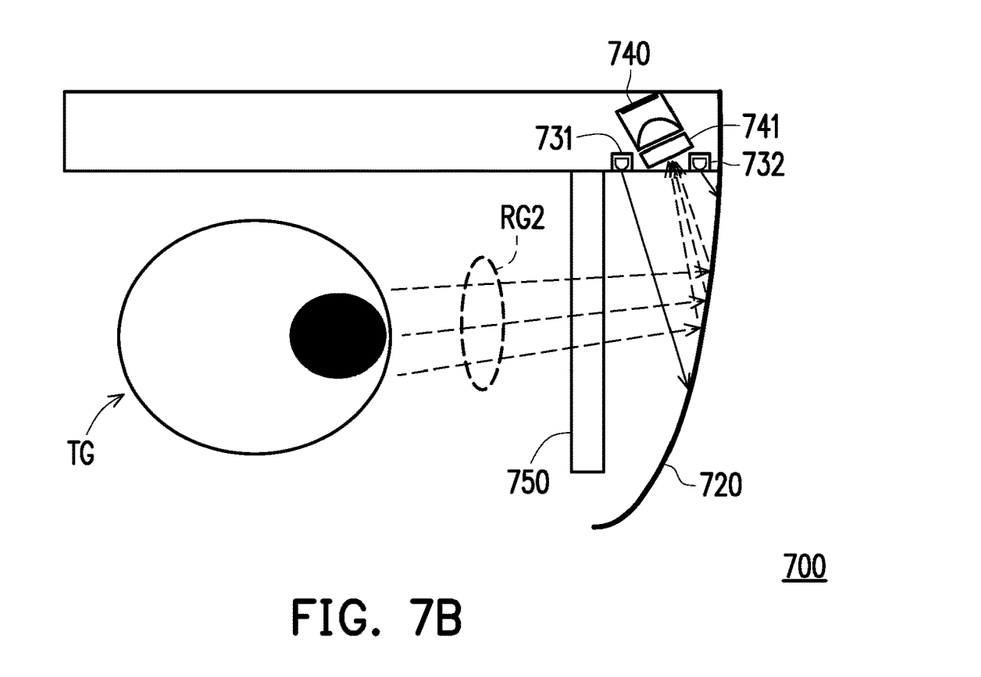

Please refer to FIG. 7A and FIG. 7B below. FIG. 7A and FIG. 7B are respectively schematic views of a head mounted display device according to different embodiments of the disclosure. In FIG. 7A, a head mounted display device 700 includes a frame 710, a mask 720, infrared transmitters 731 and 732, an image capture device 740, a display 750, and a lens set 741. Different from the foregoing embodiment, the lens set 741 is a lens set with an adjustable focal length and is disposed in front of the lens of the image capture device 740. When the lens set 741 is at a first focal length, the image capture device 740 may capture a target area image on a target area TG of a first field of view RG1. When the lens set 741 is adjusted to a second focal length, as shown in FIG. 7B, the image capture device 740 may capture a target area image on the target area TG of a second field of view RG2. The first focal length is greater than the second focal length, and the first field of view RG1 may be greater than the second field of view RG2.

It is worth mentioning that when the lens set 741 is adjusted to the second focal length, the image capture device 740 may capture a small range image of the eyeballs of the user, and the head mounted display device 700 may execute an iris recognition action of the user according to the small range image. In other words, through the configuration of the lens set 741, the performance of the head mounted display device 700 can be further improved.

Figure 8A:
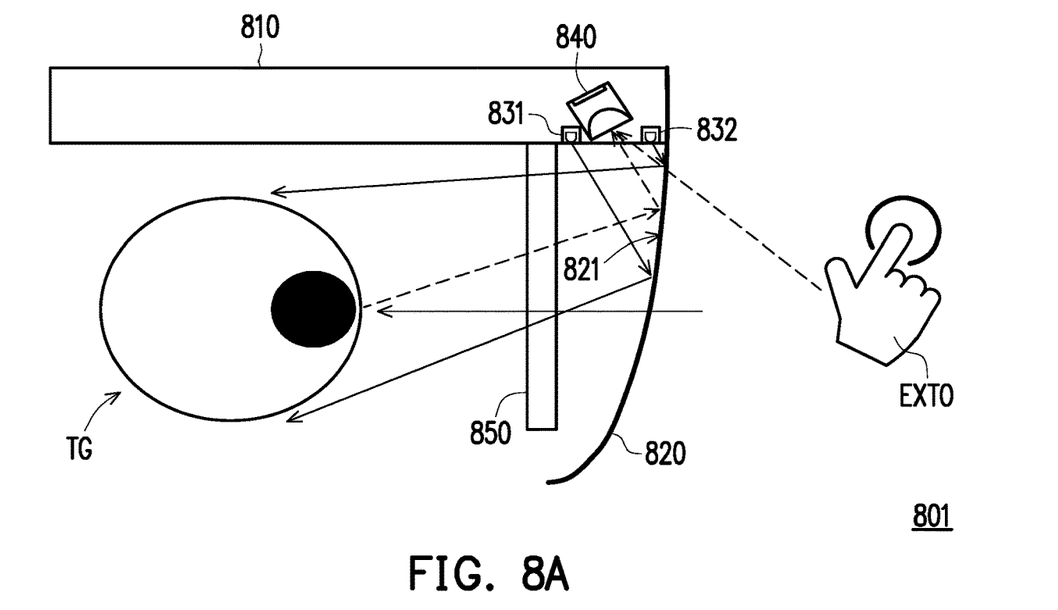
FIG. 8A and FIG. 8B are respectively schematic views of head mounted display devices according to different embodiments of the disclosure.
Figure 8B:
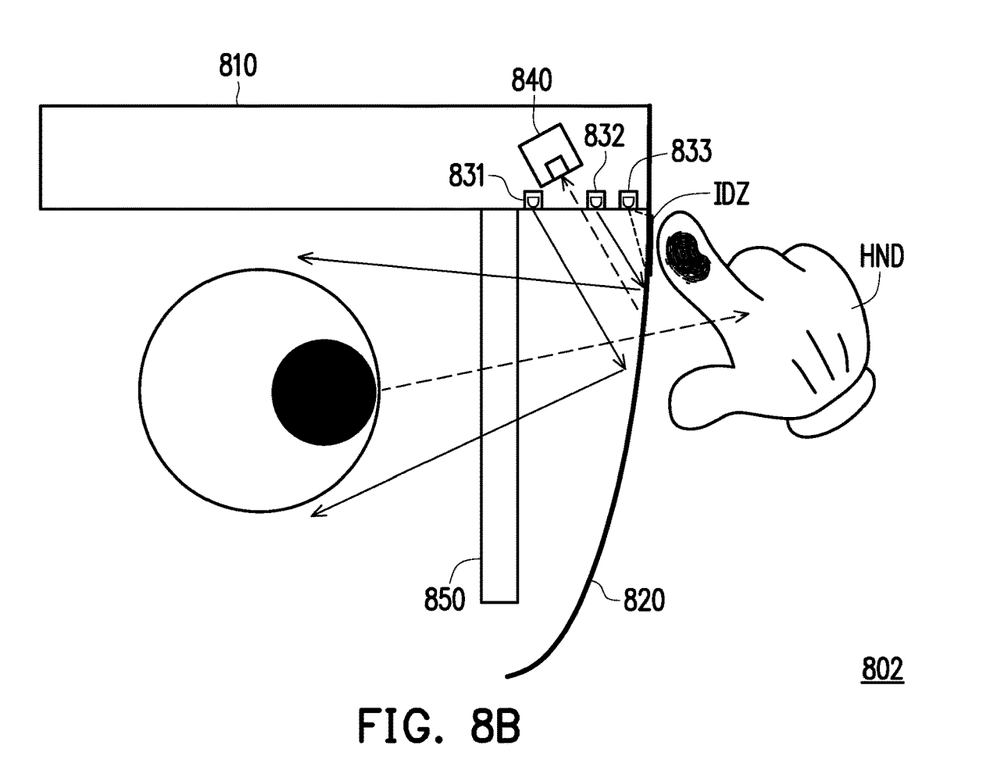

Next, please refer to FIG. 8A and FIG. 8B. FIG. 8A and FIG. 8B are respectively schematic views of head mounted display devices according to different embodiments of the disclosure. In FIG. 8A, a head mounted display device 801 includes a frame 810, a mask 820, infrared transmitters 831 and 832, an image capture device 840, and a display 850. The mask 820 has a light reflection layer 821 on a first side.

Different from the foregoing embodiment, the image capture device 840 of the embodiment of the disclosure may be further used to capture a reference object image of a reference object EXTO outside a second side of the mask 820. The first side and the second side of the mask 820 are opposite to each other. The first side of the mask 820 is located on the inner side of the head mounted display device 800, and the second side of the mask 820 is located on the outer side of the head mounted display device 800.

The reference object EXTO of the embodiment may be a hand of the user or may also be a tool, which may be any tool such as a pen and a lamp, held by the user. The head mounted display device 801 may execute a corresponding action through the reference object image of the reference object EXTO captured by the image capture device 840. Simply put, the user may use a gesture to issue an operation command to the head mounted display device 801, and the head mounted display device 801 may analyze the command to be executed according to the reference object image.

Here, the head mounted display device 801 may directly capture the reference object image of the reference object EXTO without the mechanism of light reflection.

In FIG. 8B, compared to the head mounted display device 801, a head mounted display device 802 further includes a fingerprint identification indicator 833. The fingerprint identification indicator 833 is disposed in the frame 810. The fingerprint identification indicator 833 is used to define a fingerprint identification area IDZ on the mask 820. The fingerprint identification indicator 833 may be an infrared transmitter, wherein the wavelength of infrared light sent by the fingerprint identification indicator 833 may be different from the wavelengths of emitting light beams sent by the infrared transmitters 831 and 832.

In addition, the fingerprint identification area IDZ is used by the user to perform a fingerprint pressing action. Simultaneously, the image capture device 840 may capture a fingerprint image of the user on the fingerprint identification area IDZ and execute a fingerprint identification action according to the fingerprint image.

Figure 9:
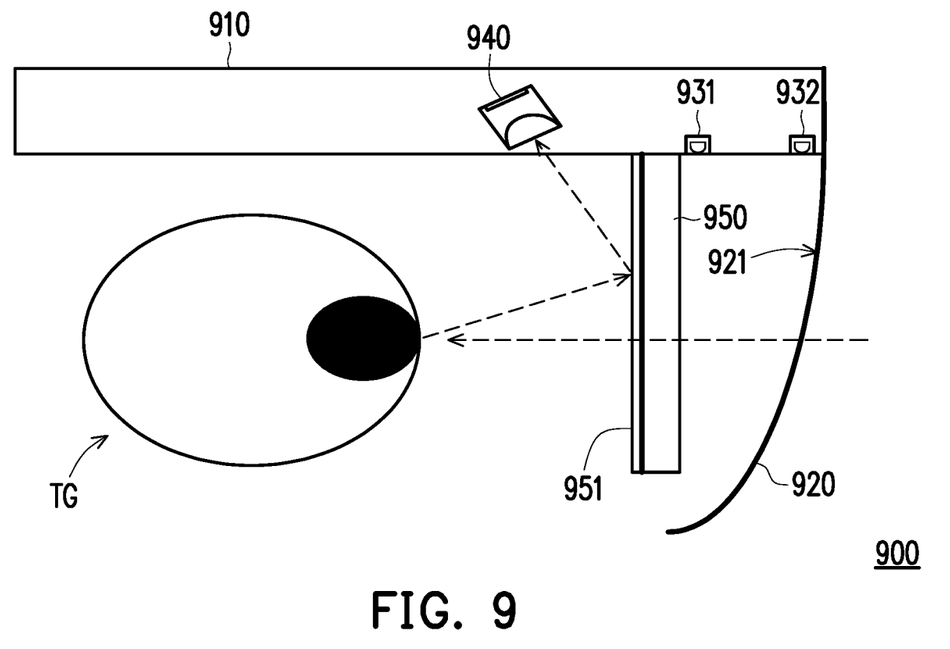
FIG. 9 is a schematic view of a head mounted display device according to another embodiment of the disclosure.

Please refer to FIG. 9. FIG. 9 is a schematic view of a head mounted display device according to another embodiment of the disclosure. A head mounted display device 900 includes a frame 910, a mask 920, infrared transmitters 931 and 932, an image capture device 940, and a display 950. The mask 920 has a light reflection layer 921 for reflecting infrared light beams generated by the infrared transmitters 931 and 932 on a first side. Different from the foregoing embodiment, the display 950 of the embodiment has another light reflection layer 951 on the surface facing a target area. The lens of the image capture device 940 faces the light reflection layer 951 and is used to capture a target area reflective image of the target area on the light reflection layer 951.

Figure 10A:
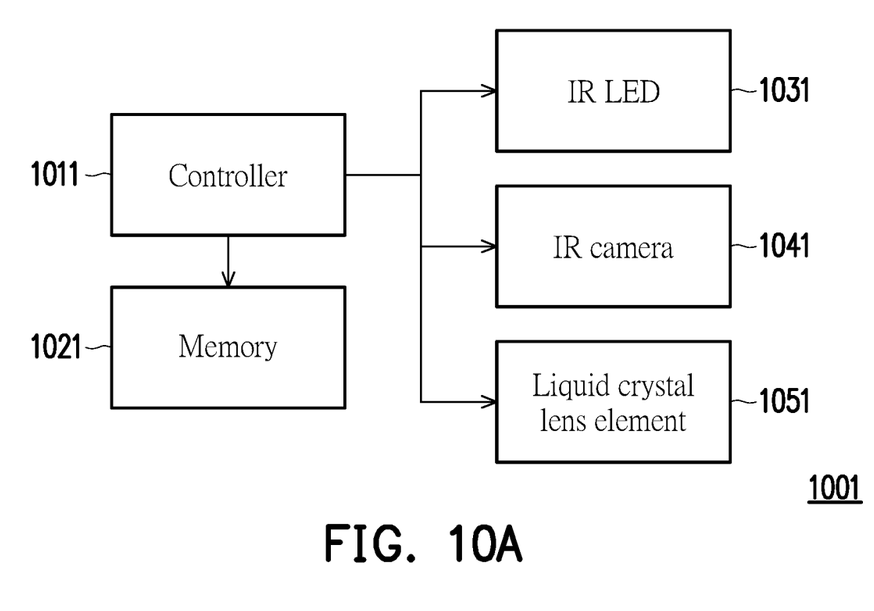
FIG. 10A to FIG. 10C are respectively schematic views of various different control mechanisms of head mounted display devices according to an embodiment of the disclosure.
Figure 10B:
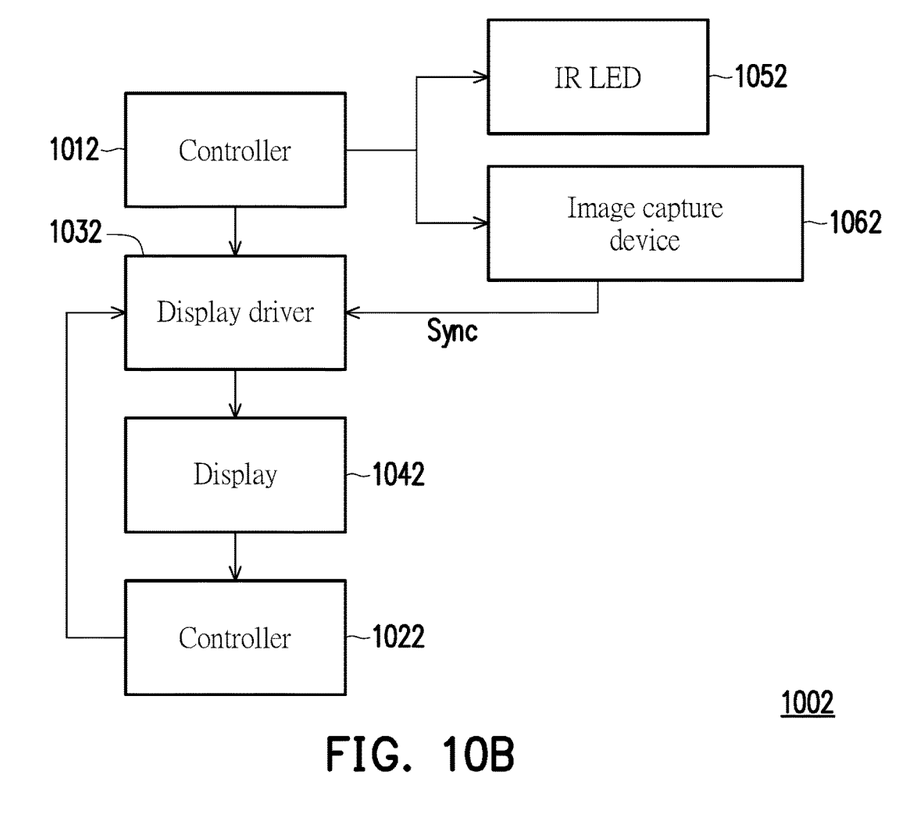
Figure 10C:
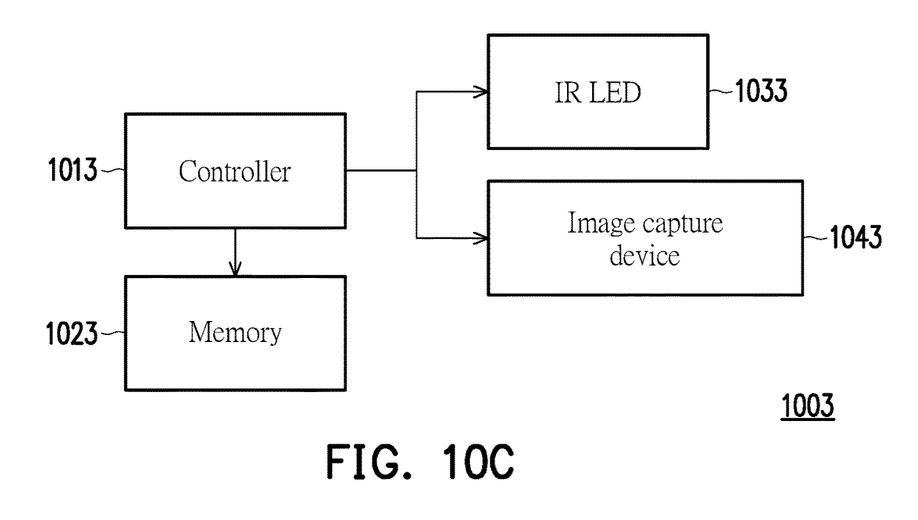

Please refer to FIG. 10A to FIG. 10C. FIG. 10A to FIG. 10C are respectively schematic views of various different control mechanisms of head mounted display devices according to an embodiment of the disclosure. In FIG. 10A, a head mounted display device 1001 includes a controller 1011, a memory 1021, an infrared light emitting diode (IR LED) 1031, an infrared (IR) camera 1041, and a liquid crystal lens element 1051, which may correspond to the embodiment of FIG. 7A and FIG. 7B of the disclosure. The infrared light emitting diode 1031 corresponds to the infrared transmitters 731 and 732, the infrared camera 1041 corresponds to the image capture device 740, and the liquid crystal lens element 1051 corresponds to the zoom lens element 741.

The controller 1011 is coupled to the memory 1021, the infrared light emitting diode 1031, the infrared camera 1041, and the liquid crystal lens element 1051. The controller 1011 may send a control signal that is an electrical signal to control the field of view of the infrared camera 1041. The controller 1011 may generate a first lock key according to a random number generation mechanism and determine the number and the position of the infrared light emitting diode 1031 to be lit through the first lock key. Simultaneously, the infrared camera 1041 may capture a first eyeball image on a target area TG. Then, the controller 1011 generates a second lock key according to the random number generation mechanism and determine the number and the position of the infrared light emitting diode 1031 to be lit through the second lock key, so that the infrared camera 1041 may capture a second eyeball image of the target area TG. Then, the controller 1011 may compare the first eyeball image and the second eyeball image according to a preset database and execute an iris recognition action for the user.

The memory 1021 in the embodiment may be used as a temporary storage area for data required during an iris recognition process or may be used to store a preset database.

In addition, in FIG. 10B, a head mounted display device 1002 includes a controller 1012, a display driver 1032, a display 1042, a controller 1022, an infrared light emitting diode (IR LED) 1052, and an image capture device 1062, which may correspond to the embodiment in FIG. 8A of the disclosure. The infrared light emitting diode 1031 corresponds to the infrared transmitters 831 and 832. The controller 1012 is coupled to the display driver 1032, the infrared light emitting diode 1052, and the image capture device 1062. The display driver 1032 is coupled to the display 1042, the controller 1022, and the image capture device 1062.

In the embodiment, the head mounted display device 1002 may be used to execute a three-dimensional virtual object display action of eyeball tracking and space tracking. The controller 1012 may load position correction information related to the image capture device 1062 and the display 1042. The display 1042 may be used to display a three-dimensional image. Then, the image capture device 1062 may capture an eyeball image of the user and a hand image the user. Then, the controller 1012 analyzes and obtains corresponding positions of the eyeballs and a hand in a three-dimensional space. Then, the controller 1012 calculates sizes corresponding to virtual object images in the space according to the corresponding positions of the eyeballs and the hand. The virtual object images are divided into two-dimensional images of the left and right eyes. The two-dimensional images are combined with other virtual display images (such as a status bar), then output to the displays 1042 respectively corresponding to different eyes for the user to view, and then synthesized by the brain of the user to generate a three-dimensional virtual image.

In the embodiment, the display driver 1032 receives synchronization information Sync transmitted by the image capture device 1062 and drives the display 1042 according to the synchronization information Sync to generate a display image. A virtual display image may be provided by the controller 1022. The display driver 1032 may execute a combining action of the two-dimensional images and the virtual display image.

In FIG. 10C, a head mounted display device 1003 includes a controller 1013, a memory 1023, an infrared light emitting diode (IR LED) 1033, and an image capture device 1043, which may correspond to the embodiment in FIG. 6B of the disclosure. The infrared light emitting diode 1033 corresponds to the infrared transmitters 631 and 632. The controller 1013 is coupled to the memory 1023, the infrared light emitting diode (IR LED) 1033, and the image capture device 1043.

In terms of action execution, the controller 1013 may first load position correction information of the image capture device 1043. Then, the image capture device 1043 may capture an eyeball image and a lip image of the user. The controller 1013 analyzes a gaze point of the user and analyzes lip information. The controller 1013 may update avatar information of the user according to the gaze point of the user and the lip information. The controller 1013 may store multiple continuous lip information in a queue according to time sequence and obtain lip language information expressed by the user through analyzing the lip information.

The image capture device 1043 may continuously execute actions of capturing the eyeball image and the lip image of the user to achieve real-time monitoring of head movement and related information such as the lip language information of the user.

In summary, in the head mounted display device of the disclosure, the image capture device captures the target area reflective image of the target area by using the mechanism of light reflection, and the infrared transmitter transmits the infrared light beam to the eyeballs of the user also by using the mechanism of light reflection. In this way, the infrared emitting light beam may be projected to the target area frontally, and the image capture device may capture the frontal eyeball image of the user, which can improve the accuracy of the eyeball tracking action.

What is claimed is:

1. A head mounted display device, comprising:
   a frame;
   a mask, having a first light reflection layer on a first side thereof;
   at least one infrared transmitter, disposed in the frame and used to emit at least one emitting light beam toward the first light reflection layer, wherein the first light reflection layer reflects the at least one emitting light beam to send at least one reflective light beam toward a target area; and
   at least one image capture device, disposed in the frame and used to capture at least one target area reflective image of the target area,
   wherein the at least one image capture device captures the target area reflective image from the first light reflection layer on the mask.

2. The head mounted display device according to claim 1, wherein the at least one reflective light beam generates at least one light spot in the at least one target area reflective image.

3. The head mounted display device according to claim 1, wherein the target area comprises a first region corresponding to a first eye of a user and a second region corresponding to a second eye of the user, the head mounted display device further comprising:
   a fisheye lens, disposed in front of a lens of the at least one image capture device, so that the at least one image capture device simultaneously captures a first target area reflective image corresponding to the first eye of the user and a second target area reflective image corresponding to the second eye of the user.

4. The head mounted display device according to claim 3, wherein the target area comprises the first region corresponding to the first eye of the user and the second region corresponding to the second eye of the user; the at least one image capture device comprises a first image capture device and a second image capture device; the first image capture device is used to simultaneously capture the first target area reflective image corresponding to the first eye of the user in the first region and the second target area reflective image corresponding to the second eye of the user in the second region; and the second image capture device is used to simultaneously capture a third target area reflective image corresponding to the first eye of the user in the first region and a fourth target area reflective image corresponding to the second eye of the user in the second region.

5. The head mounted display device according to claim 4, wherein the at least one image capture device is further used to capture an auxiliary image of an auxiliary target area, wherein
the auxiliary target area corresponds to lips of the user.

6. The head mounted display device according to claim 5, wherein the first target area reflective image and the second target area reflective image are infrared light images, and the auxiliary image is a visible light image.

7. The head mounted display device according to claim 6, wherein the at least one image capture device has a visible light sensing pixel and an infrared light sensing pixel.

8. The head mounted display device according to claim 5, further comprising:
a light reflection element, disposed in the frame, wherein the at least one image capture device captures the auxiliary image through the light reflection element.

9. The head mounted display device according to claim 1, further comprising:
a light reflection element, disposed in the frame, wherein the at least one image capture device captures the at least one target area reflective image through the light reflection element.

10. The head mounted display device according to claim 1, further comprising:
at least one lens set, disposed in front of a lens of the at least one image capture device.

11. The head mounted display device according to claim 10, wherein the at least one lens set has an adjustable focal length.

12. The head mounted display device according to claim 1, wherein the at least one image capture device is further used to capture a reference object image outside a second side of the mask.

13. The head mounted display device according to claim 1, further comprising:
a fingerprint identification indicator, disposed in the frame and used to define a fingerprint identification area on the mask, wherein
the at least one image capture device captures a fingerprint image on the fingerprint identification area as a basis for a fingerprint identification action.

14. The head mounted display device according to claim 1, further comprising:
a first controller, coupled to the at least one infrared transmitter and the at least one image capture device, and driving the at least one infrared transmitter to send the at least one emitting light beam to execute an eyeball tracking action on the target area according to the at least one light spot on the at least one target area reflective image.

15. The head mounted display device according to claim 14, further comprising:
a display, disposed between the target area and the mask and coupled to the first controller; and the display being used to project a display image to the target area.

16. The head mounted display device according to claim 15, further comprising:
a display driver, coupled to the display, wherein the display driver receives synchronization information transmitted by the at least one image capture device and drives the display to generate the display image according to the synchronization information.

17. The head mounted display device according to claim 15, further comprising:
a second controller, coupled to the display driver and used to provide a virtual display image.

18. The head mounted display device according to claim 14, wherein the first controller is further used to perform an iris recognition action according to the at least one target area reflective image.

19. The head mounted display device according to claim 14, wherein the display has a second light reflection layer on a surface facing the target area, and the at least one image capture device captures the target area reflective image from the second light reflection layer on the display.

* * * * *